(12) United States Patent
Lau et al.

(10) Patent No.: US 8,609,193 B2
(45) Date of Patent: Dec. 17, 2013

(54) POLY(ETHYLENE GLYCOL) AND POLY(ETHYLENE OXIDE) BY INITIATED CHEMICAL VAPOR DEPOSITION

(75) Inventors: Kenneth K. S. Lau, Cherry Hill, NJ (US); Ranjita K. Bose, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 13/203,425

(22) PCT Filed: Mar. 17, 2010

(86) PCT No.: PCT/US2010/027609
§ 371 (c)(1),
(2), (4) Date: Aug. 25, 2011

(87) PCT Pub. No.: WO2010/111084
PCT Pub. Date: Sep. 30, 2010

(65) Prior Publication Data
US 2011/0305837 A1  Dec. 15, 2011

Related U.S. Application Data

(60) Provisional application No. 61/162,765, filed on Mar. 24, 2009.

(51) Int. Cl.
*C23C 16/44* (2006.01)
*C08G 65/28* (2006.01)

(52) U.S. Cl.
USPC .......... 427/255.28; 427/248.1; 528/421; 528/416; 528/408; 528/409; 528/405

(58) Field of Classification Search
None
See application file for complete search history.

(56) References Cited

U.S. PATENT DOCUMENTS

| | | | |
|---|---|---|---|
| 4,195,132 A * | 3/1980 | Sundermann et al. | 521/155 |
| 6,444,389 B1 * | 9/2002 | Ninomiya et al. | 430/110.3 |
| 2002/0103307 A1 * | 8/2002 | Ampleman et al. | 525/415 |
| 2006/0014106 A1 * | 1/2006 | Hatakeyama et al. | 430/311 |
| 2006/0127443 A1 * | 6/2006 | Helmus | 424/423 |
| 2006/0283382 A1 | 12/2006 | Yoshilawa et al. | |
| 2007/0104860 A1 | 5/2007 | Gleason et al. | |
| 2009/0061090 A1 | 3/2009 | Yegishi et al. | |
| 2010/0303877 A1 * | 12/2010 | Timmons et al. | 424/405 |

FOREIGN PATENT DOCUMENTS

WO  2007145657  12/2007

OTHER PUBLICATIONS

Tenhaeff, Advanced Functional Materials, v18, 2008, 979-992.*
Kenneth K.S. Lau, "Particle Surface Design Using an All-Dry Encapsulation Method", Adv. Mater. 2006, 18, 1972-1977.

(Continued)

*Primary Examiner* — Joseph Miller, Jr.
(74) *Attorney, Agent, or Firm* — Mendelsohn, Drucker & Dunleavy, P.C.

(57) ABSTRACT

A method for ionic polymerization of ethylene oxide. In the first step of the method, a gaseous monomer composition comprising ethylene oxide at a first flow rate is mixed with a gaseous ionic polymerization initiator at a second flow rate, thereby forming a mixture. The formed mixture is then heated with at least one heated filament to thereby form at least one polymer. The method may also be employed to coat a variety of different substrates in situ during the polymerization reaction.

21 Claims, 3 Drawing Sheets

(56) References Cited

OTHER PUBLICATIONS

Kenneth K.S. Lau, "All-Dry Synthesis and Coating of Methacrylic Acid Copolymers for Controlled Release", Macromol. Biosci. 2007, 7, 429-434.

Article, "Initiated Chemical Vapor Disposition (iCVD) of Poly(alkyl acrylates); A Kinetic Model", Macromolecules, 2006, 39 (10), 3695-3703• DOI: 10.1021/ma0601621 • Publication Date (Web) Apr. 11, 2006.

Article, "Initiated Chemical Vapor Disposition (iCVD) of Poly(alkyl acrylates); An Experimental Study", Macromolecules, 2006, 39 (10), 3688-3694• DOI: 10.1021/ma0601619 • Publication Date (Web): Apr. 11, 2006.

Article, Kenneth K.S. Lau, et al, "Superhydrophobic Carbon Nanotube Forests", Nano Letters, 2003, 3 (12), 1701-1705• DOI: 10.1021/nl034704t• Publication Date (Web): Oct. 22, 2003.

Article, Kenneth K.S. Lau, et al, "Fluorocarbon Dielectrics Via Hot Filament Chemical Vapor Deposition", Journal of Fluorine Chemistry 122 (2003) 93-96.

Tenhaeff et al, Initiated and Oxidated Chemical Vapor Deposition Thin Films: iCVD and oCVD, Advanced Functional materials, vol. 28, Apr. 2008, pp. 979-992. See abstract, table 1-3, p. 982.

\* cited by examiner

POLY(ETHYLENE GLYCOL) AND POLY(ETHYLENE OXIDE) BY INITIATED CHEMICAL VAPOR DEPOSITION

CROSS-REFERENCE TO RELATED APPLICATIONS

This application is a non-provisional of U.S. provisional application No. 61/162,765, filed on Mar. 24, 2009, the entirety of which is incorporated herein by reference.

BACKGROUND OF THE INVENTION

1. Field of the Invention

The present invention is directed to the preparation of poly(ethylene glycol) and poly(ethylene oxide) by initiated chemical vapor deposition.

2. Description of the Related Technology

Chemical vapor deposition (CVD) of inorganic thin films is a widely used technology for the fabrication of integrated circuits in the semiconductor industry. A specialized version of CVD, initiated chemical vapor deposition (iCVD), is used for polymeric thin film synthesis. iCVD typically uses lower temperatures compared to CVD thus allowing synthesis of linear polymers without undesirable side groups or cross-linking and essentially perfect retention of functional groups in the polymer. iCVD polymerization has been demonstrated via the free radical polymerization mechanism for acrylates, methacrylates, styrenic monomers, and other vinyl monomers.

Chemical vapor deposition (CVD) is a broad term that includes thermal CVD that uses high substrate temperatures, e.g. in silicon dioxide growth; plasma enhanced CVD (PECVD) that uses high electromagnetic (DC, RF, microwave) excitation energy, e.g. in plasma polymerization; hot filament CVD (HFCVD) that uses high filament temperature e.g. in diamond and amorphous silicon; and iCVD that uses much lower substrate and filament temperatures than HFCVD enabling polymer deposition and coating of temperature sensitive surfaces. PECVD suffers from the additional disadvantage that it excessively breaks down the precursor leading to cross-linking and loss of chemical functionality during the polymerization process.

Poly(ethylene glycol) (PEG) is a technologically important polymer with many biomedical applications including tissue engineering, drug delivery, non-biofouling membranes and spatial patterning of cells. Ethylene oxide was used as the monomer in conjunction with anionic as well as cationic initiators. PEG is referred to as poly(ethylene oxide) (PEO) when its molecular weight is higher than 20,000 g/mol.

Conventional methods for the preparation of poly(ethylene glycol) and poly(ethylene oxide) rely on liquid phase synthesis and processing. As such, these methods employ solvents and liquids and thus suffer from solvent constraints, solvent toxicity and contamination problems, solvent-induced morphology changes in the polymer, liquid surface tension that prevents conformal coating of micro and nanostructures, and thick coatings. iCVD overcomes these challenges by bypassing the liquid phase, enabling control over film thickness down to the nanoscale, conformally coating and shrinkwrapping the substrate, including complex 3D architectures, and enabling the tunability of polymer chemistries/properties not possible with solvent-constrained systems.

An all-dry encapsulation method that enables well-defined polymers to be applied around particles of sizes down to the nanoscale is known from, for example, WO 2007/145657A2. In certain embodiments, the encapsulation method is a modified form of initiated chemical vapor deposition (iCVD) using a thermally-initiated free radical polymerization to create conformal coatings around individual particles while avoiding agglomeration. In another embodiment, iCVD may be used to encapsulate fine drug microcrystals (e.g., below 100 µm in size) with methacrylic acid copolymers (such as poly (methacrylic acid-co-ethyl acrylate) and poly(methacrylic acid-co-ethylene dimethyacrylate)) for the purpose of conferring enteric release properties. iCVD is said to provide a uniform or substantially uniform coating on rough, fibrous, and porous morphologies with high surface areas. By using controlled radical polymerization chemistries, iCVD produces exceptionally clean polymers with stoichiometric compositions, high molecular weights and having no residual solvents, excipients, glidants or plasticizers. With plasma-based dry methods, fully functional linear polymers are not produced because the high-energy plasma environment results in non-selective chemistries which lead to crosslinked networks.

The initiators used in free radical polymerization are molecules that yield radicals by bond dissociation for initiating chain polymerization, such as peroxides where the oxygen-oxygen bond is weak, or azo compounds where the nitrogen-nitrogen bonds is weak. In making free radical polymers, typically the monomers contain carbon-carbon double bonds susceptible to the free radical in order to propagate the polymer chain.

Also, the reaction conditions used for free radical polymerization may be different from the reaction conditions required for other types of polymerization such as ionic polymerization or ring-opening polymerization. As such, it would be very difficult for one skilled in free radical polymerization to transfer that knowledge to ionic polymerization.

Accordingly, there is a need in the art for polymerization and coating processes which employ ionic polymerization methods in order to provide additional desirable products including polymers which cannot be typically made by free radical initiated polymerization reactions. These and other objects and aspects of the invention will be apparent from the summary and detailed descriptions which follow.

SUMMARY OF THE INVENTION

In a first aspect, the present invention relates to a method of preparing a polymer by initiated chemical vapor deposition. In the first step of the method, a gaseous monomer composition comprising ethylene oxide at a first flow rate is mixed with a gaseous ionic polymerization initiator at a second flow rate, thereby forming a mixture. The formed mixture is then heated with at least one heated filament to thereby form at least one polymer.

In a second aspect, the present invention also relates to a method of coating a substrate. In the method, a substrate is placed in a vessel. A monomer composition comprising a gaseous ethylene oxide monomer at a first flow rate is mixed with a gaseous initiator at a second flow rate, thereby forming a mixture. The mixture is then heated with at least one heated filament to thereby form a coating of at least one polymer on at least a portion of the substrate.

DETAILED DESCRIPTION OF EMBODIMENTS OF THE INVENTION

Figure 1A:
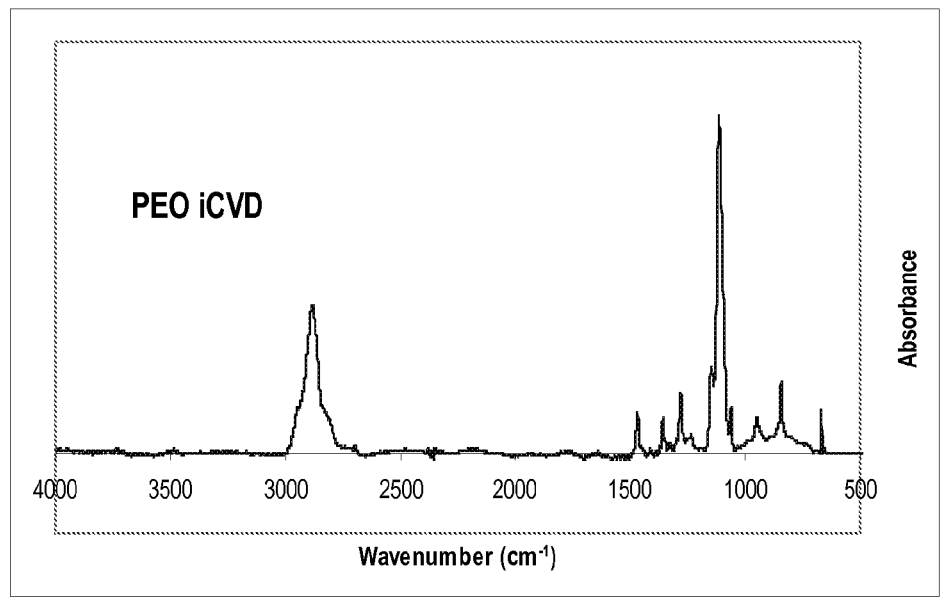
FIG. 1A shows Fourier transform infrared (FTIR) analysis of PEG synthesized in Example 3 of the present application.

Initiated chemical vapor deposition (iCVD) has been successfully utilized to create poly(ethylene glycol) (PEG) and poly(ethylene oxide) (PEO) thin films and coatings without the use of liquid solvents. Monomer and initiator are delivered into the iCVD reactor system in the form of vapors. Suitable apparatus for carrying out the iCVD reaction is described, for example, in *Macromolecules* 2006, 39, 3688-3694; *Thin Solid Films* 2006, 501, 211-215; and U.S. Patent application publication nos. 2007/032620 and 2006/228966.

The initiator is heated by one or more heated filament wires and becomes activated. The activated initiator together with the monomer adsorbs onto a cooled substrate/surface, typically at room temperature, where surface polymerization takes place to form a continuous, conformal coating of PEG/PEO on the substrate/surface. Thus, iCVD is a one-step polymer synthesis and polymer coating process that does not rely on liquid-based synthesis or processing.

PEG and PEO may be synthesized via iCVD via ionic polymerization methods using anionic and cationic initiators. With ionic polymerization, the initiators directly attack the monomer to initiate chain polymerization without first undergoing bond dissociation. In making ethylene oxide/glycol polymers, a ring monomer is used, for example, ethylene oxide, or higher crown ethers. As such the latter is also a ring-opening polymerization besides being an ionic polymerization.

Parameters which may play a role in the iCVD process include monomer and initiator flow rates, reactor pressure, substrate temperature, filament temperature, initiator temperature filament height and monomer to initiator ratio.

The iCVD process can take place at a range of pressures from atmospheric pressure to low vacuum. In certain embodiments, a low operating pressure, typically in the range of about 10 Pa to about 100 Pa may be employed. In certain embodiments, the operating pressure may be from about 50 to 3000 Pa, more preferably, from about 600 to 1400 Pa.

The flow rate of the monomer can be adjusted in the iCVD method. In certain embodiments the monomer flow rate of the monomer is from about 1 to about 20 sccm, more preferably, from about 10 to about 15 sccm. The monomer flow rates generally depend on the desired residence time within the reactor and thus the flow rate values can be adjusted depending upon the size or volume of the iCVD reactor.

The flow rate of the initiator can be adjusted in the iCVD method of the present invention. In certain embodiments the initiator flow rate is from about 0.1 to about 5 sccm. More preferably, the initiator flow rate is from about 0.5 to about 2.5 sccm.

The temperature of the filament can be adjusted in the iCVD method. The filament temperature may range from 200 to about 400° C., more preferably, from about 300 to about 350° C. In certain embodiments the temperature of the filament is about 350° C.

The filament height employed in the reactor may also be varied in accordance with the invention. Suitable filament heights may vary from about 5 to about 20 mm, more preferably, from about 10 to about 16 mm.

For the present iCVD process, the choice of filament may be significant. Certain filament wire materials work better than others when performing ionic polymerization. Suitable filament wire materials for the process of the present invention include, but are not limited to, alloys of copper, tin and phosphorus, nickel chrome alloys such as Chromalloy™, and phosphor bronze.

The iCVD process of the present invention may employ a substrate onto which the polymer will be deposited during the polymer production process. Substrates can be silicon wafers, paper, plastic, membranes, fibers, fabrics, microparticles, nanoparticles, nanotubes, 3D architectures, microfabricated devices, sensors, cantilevers, drug particles, inorganic microspheres, etc. Typically, any object that is stable in vacuum at the operating pressures can be used. For substrates that do not require agitation for deposition as discussed below, they usually sit on a stage that is maintained at a set temperature using backside contact recirculating water. For substrates that are agitated, e.g. by rotation, the rotating vessel is maintained at a set temperature by a water bath.

The iCVD process can take place at a range of substrate temperatures of from about −10° C. to about 100° C., more preferably, from about 0° C. to about 20° C. The substrate temperature may be controlled, for example, by a water bath.

In some embodiments of the present ionic polymerization reaction, it may be necessary to preheat the reactants to achieve good quality films. Preheating is typically not important for iCVD free radical polymerization reactions. For example, for ionic polymerization reactions, the initiator may be preheated to a temperature of from about 100° C. to about 150° C., more preferably, to a temperature of about 140° C.

The monomer may also be preheated to a temperature of from about 100° C. to about 150° C., more preferably, to a temperature of about 140° C.

Suitable initiators for the ionic polymerization process of the present invention include anionic and cationic initiators. Ring opening initiators like trifluoromethane sulfonic acid and other strong protonic acids known to initiate ring-opening polymerization reactions are also suitable for use in the present invention, at least when the ionic polymerization reaction is conducted in solution phase.

Cationic initiators which may be useful in the method of the present invention include, but are not limited to, Lewis acids such as $BF_3$, $SnCl_4$, $TiCl_4$ and $AlCl_3$. Suitable anionic initiators tend to be more nucleophilic initiators than their cationic counterparts. Exemplary anionic initiators are organometallics such as diethyl zinc and metal alkoxides.

Boron trifluoride ($BF_3$) conjugated with tetrahydrofuran (THF), diethyl ether and tert-butyl methyl ether which is available in liquid form with increasing values of vapor pressure, are specific examples of suitable cationic initiators useful in the present invention. Suitable anionic initiators include, but are not limited to, trifluoromethanesulfonic acid (TFMSA) and aluminum isopropoxide.

Optionally, the process of the present invention may be carried out in the presence of one or more co-initiators. Suitable co-initiators for the present process may include, but are not limited to alcohols, water and alkyl halides.

Suitable monomers for use in the present invention include, but are not limited to, ethylene oxide, ethylene glycol and crown ether monomers.

Optionally, one or more co-monomers may also be employed in the process of the present invention to provide co-polymers of ethylene glycol and/or ethylene oxide. Suitable co-monomers may include, but are not limited to, ethylene oxide, ethylene glycol and crown ether monomers. In addition, the monomers described in U.S. Patent application publication nos. 2007/032620 and 2006/228966, the disclosures of which are hereby incorporated by reference, can also be used as co-monomers in the process of the present invention.

The most preferred reaction parameters which gave best deposition rate and stoichiometric PEG are as follows:
Monomer: Ethylene oxide, flow rate=10 sccm
Initiator: Boron trifluoride-diethyl etherate, flow rate=1 sccm
Filament: Phosphor bronze
Reactor Pressure: 10 Torr
Temperature (substrate)=0° C.
Temperature (filament)=350° C.
Temperature (initiator)=25° C.
Filament height=13 mm
Deposition rate: 30 nm/min or ~10 mg PEG/h.
Deposition rate is determined via laser interferometry, where one cycle of film thickness is calculated using the refractive index and angle of incidence, and the deposition rate is product of cycle thickness and number of cycles per time. Laser interferometry allows in situ real time film thickness monitoring by measuring optical interference between reflections at the top film surface and the bottom substrate surface. As the film thickness increases, the interference changes as a function of the refractive index of the polymer film and the angle of incidence of the beam. Besides interferometry, quartz crystal microbalance (QCM) is also a suitable measurement device that can be mounted inside the iCVD reactor to measure deposition rate.

The method of the present invention is suitable for the production of PEG and/or PEO. The method of the present invention is also useful for providing polymeric thin films and providing polymer coatings on various substrates. The method of the invention may be particularly useful for coating three-dimensional substrates. Such coatings can be applied by carrying out the iCVD polymerization reaction in the presence of the substrate in order to deposit a coating of the resultant polymer product onto the surface of the substrate. Since the reactants are mixed in gaseous form in the present iCVD process, deposition can be successfully carried out on three-dimensional substrates. The process of the invention is also particularly advantageous relative to other processes since no liquid solvents need be employed.

In general, for two- and three-dimensional substrates where all surfaces present themselves for coating by deposition, no additional measures are required to coat these surfaces. For three-dimensional substrates where this is not the case, some form of agitation is generally useful to ensure coating of the surfaces during the polymerization reaction. Various forms of agitation are suitable for the present invention include, for example, rotation of the vessel at a rotating speed for a period of time during the polymerization reaction. Fluidization and vibration are also possible modes of agitating the particles of polymer to coat three-dimensional objects.

A suitable method of coating a substrate in accordance with the present invention starts by placing a substrate in a vessel. The vessel is then rotated at a rotating speed for a period of time. A monomer composition comprising gaseous ethylene glycol monomer at a first flow rate and a gaseous ionic polymerization initiator at a second flow rate are mixed together to form a mixture. The mixture is then heated with at least one heated filament to thereby form a coating of at least one polymer on at least a portion of said substrate while said vessel is being rotated.

The iCVD process of the present invention combines design freedom with topological control of the polymer deposition process to provide a method that is flexible and thus can be adapted to a variety of different applications. The ionic polymerization kinetics of iCVD are similar enough to the kinetics of liquid phase ionic polymerization to predict that reasonable reaction rates can be achieved using iCVD.

EXAMPLES

Example 1

$BF_3$-THF was employed as the cationic initiator in the polymerization of ethylene glycol monomers. PEG films were obtained as ascertained by Fourier transform infrared (FTIR) and nuclear magnetic resonance (NMR) spectroscopy. The initiator flow rate was 0.5 sccm, and the substrate temperature was 20° C. The reactor pressure varied from 50 to 600 Pa and the filament height was 13 mm. Filament temperature was about 300° C. and initiator and monomer mixture was preheated to 140° C. The deposition rate for the initial experiments with these was about 10-30 nm/min. The deposition rate was limited by $BF_3$-THF flow rate.

Example 2

In this example, a phosphor bronze filament, an alloy of copper with tin and phosphorous was employed as the filament. This filament offered the advantage that it is free from iron and its associated corrosion problems. The initiator flow rate was 2.5 sccm, the substrate temperature was 0° C. Otherwise, the reaction conditions were the same as in Example 1. Interferometry could not be used in these experiments to determine deposition rates as the obtained polymers were in the form of spherulites or white powder, so visual inspection was used to determine qualitative increase or decrease in amount of polymer synthesis. During this time it was also observed that the $BF_3$-THF initiator underwent degradation (turned from straw to dark-brown color) in the jar upon heating as well as in the bottle on being exposed to light, air or moisture. Use of this degraded $BF_3$-THF resulted in a viscous brown deposit mostly near the vapor inlet ports and sometimes on the substrate.

Example 3

Boron trifluoride-diethyl etherate ($BF_3$-DEE), which has a vapor pressure slightly higher than $BF_3$-THF, was used as the cationic initiator with the same phosphor bronze filament as used in Example 2. The reaction parameters were as follows:
Monomer: Ethylene oxide, flow rate=10 sccm
Initiator: Boron trifluoride-diethyl etherate, flow rate=1 sccm
Filament: Phosphor bronze
Reactor Pressure: 10 Torr
Temperature (substrate)=0° C.
Temperature (filament)=350° C.
Temperature (initiator)=25° C.
Filament height=13 mm
Deposition rate: 30 nm/min or ~10 mg PEG/h This provided stoichiometric PEG formation with very fast deposition and no viscous brown impurity. The molecular weight of the PEG was found to be $M_n$=8,500 g/mol; $M_w$=13,000 g/mol; polydispersity index (PDI)=1.53. Also, the $BF_3$-DEE was found to be more stable than $BF_3$-THF on exposure to heat, light, air or moisture.

Figure 1B:
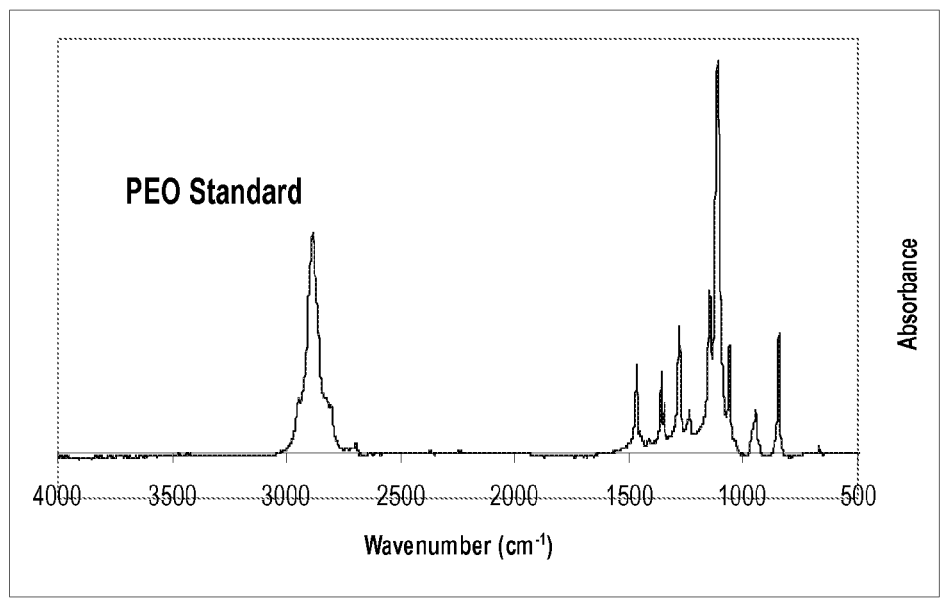
FIG. 1B shows FTIR analysis of standard PEO obtained from Aldrich Chemical.

Various characterization methods were used to characterize the product of this example. First, Fourier transform infrared analysis (FTIR) was carried out on PEG synthesized in this example and the results are compared to FTIR analysis of standard PEO obtained from Aldrich Chemical, as shown in FIGS. 1A-1B to verify the identity of the polymer product.

Figure 2:
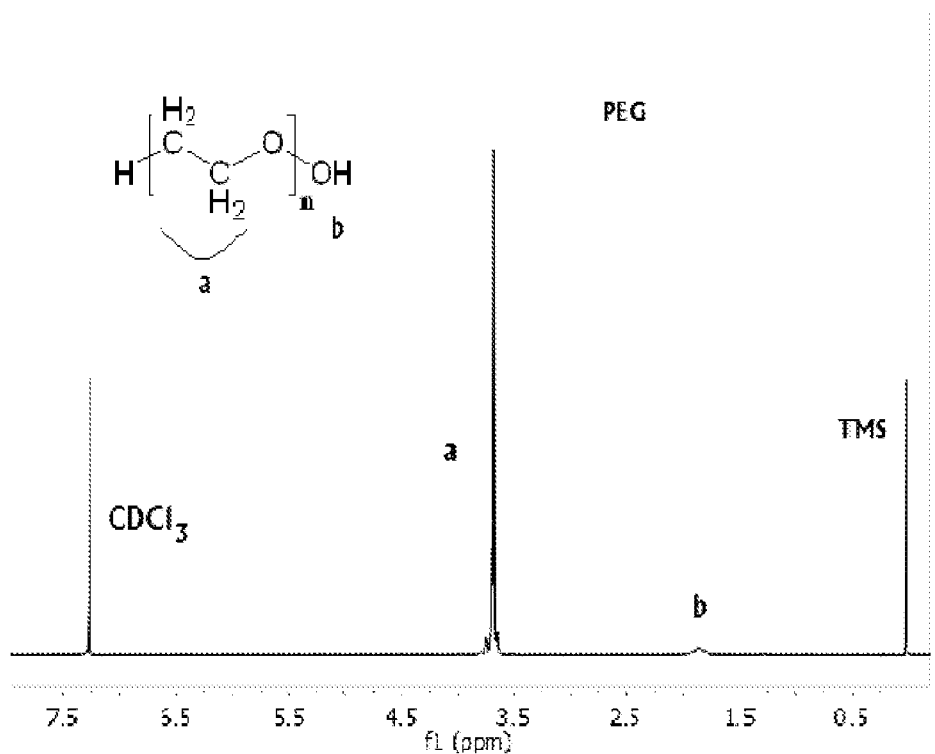
FIG. 2 shows a nuclear magnetic resonance (NMR) spectrum of the PEG synthesized in Example 3.
Figure 3:
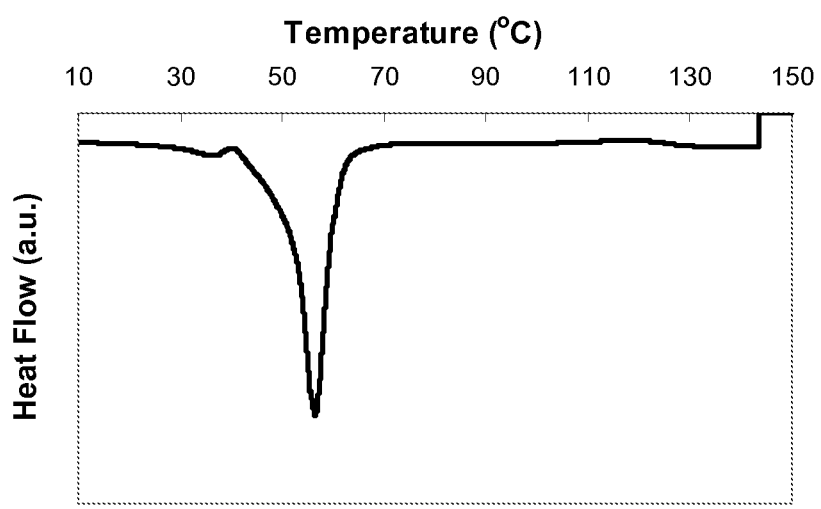
FIG. 3 shows a differential scanning calorimetry (DSC) analysis of the PEG synthesized in Example 3.

A nuclear magnetic resonance (NMR) spectrum was obtained for the PEG synthesized in Example 3 and is shown in FIG. 2. FIG. 3 shows a differential scanning calorimetry (DSC) analysis of the PEG synthesized in Example 3.

Example 4

Stannous chloride ($SnCl_2$) initiator was as the cationic initiator in this example. Stannous chloride is a fuming liquid at standard temperature and pressure conditions and hence permitted use of a very high initiator flow rate. This provided a white powdery polymer deposit on the stage. FTIR analysis showed stoichiometric inconsistencies in the PEG obtained using $SnCl_2$. This example produced PEG but was not ideal since the PEG production was not stoichiometric.

Example 5

Boron trifluoride-tert-butyl methyl etherate ($BF_3$-BME) a heavier initiator than $BF_3$-DEE was used in this example. Experimental conditions were the same as Example 1. PEG was produced by this process but at a relatively slow deposition rate.

Example 6

In example 6, the anionic initiators trifluoromethanesulfonic acid (TFMSA) and aluminum isopropoxide were employed, respectively, and yielded higher molecular weight PEO ($M_n$=34,000-65,000 g/mol; $M_w$=93,000-159,000 g/mol; PDI=2.45-2.73) but gave very slow polymer deposition. Different filament heights of 10 mm, 13 mm and 16 mm were tested and the optimum was found to be 13 mm. The co-initiators water, methanol and chloroform were also used but did not materially improve the ionic polymerization reaction.

Example 7

Figure 4:
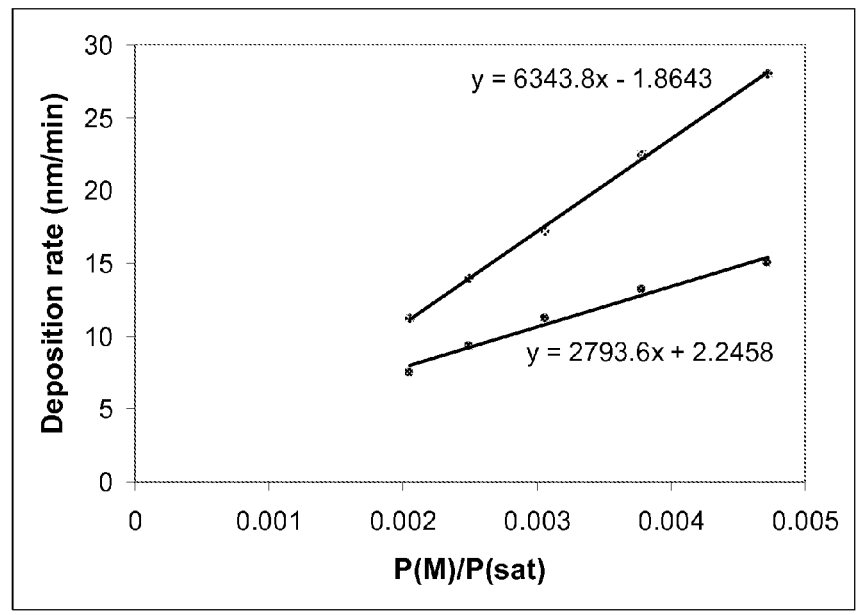
FIG. 4 is a plot of the polymer deposition rate versus the monomer partial pressure for two different sets of experimental data at different monomer flow rates.

Two different sets of experimental data showing the effect on the polymer deposition rate of changes in the monomer surface concentration (as shown by P(M)/P(sat)) indirectly through a change of monomer partial pressure with all other conditions unchanged are shown in FIG. 4. P(M)/P(sat) is the monomer partial pressure.

Example 8

Figure 5:
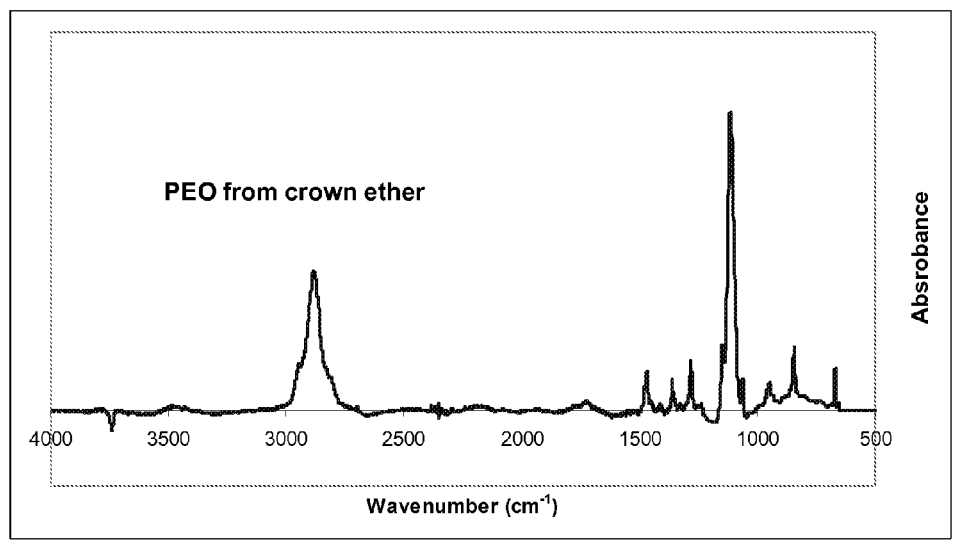
FIG. 5 is the FTIR spectra of PEO polymer obtained from 15-crown-5 monomer in Example 8 below.

15-crown-5 ($C_{10}H_{20}O_5$) was used as a monomer for synthesis of PEO/PEG polymers. The reaction parameters were as follows:
Monomer: 15-crown-5, flow rate=1 sccm
Initiator: Boron trifluoride-diethyl etherate, flow rate=1 sccm
Filament: Phosphor bronze
Reactor Pressure: 1 Torr
Temperature (substrate)=0° C.
Temperature (filament)=350° C.
Temperature (initiator)=25° C.
Filament height=16 mm
Deposition rate: 2 nm/min
The FTIR spectra of PEO polymer obtained from 15-crown-5 monomer is shown in FIG. 5.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

What is claimed is:

1. A method of preparing a coating on a substrate, said coating comprising at least one polymer prepared by initiated chemical vapor deposition, said method comprising the steps of:
   mixing together a gaseous monomer composition comprising ethylene oxide monomer at a first flow rate, and a gaseous polymerization initiator at a second flow rate, thereby forming a mixture; and
   heating said mixture with at least one heated filament to thereby cause ionic polymerization of said gaseous monomer composition to form the coating on the substrate coating comprising at least one polymer formed by ionic polymerization of said gaseous monomer composition comprising ethylene oxide monomer.

2. A method as claimed in claim 1, wherein said polymer is poly(ethylene glycol).

3. A method as claimed in claim 1, wherein said polymerization is anionic polymerization.

4. A method as claimed in claim 3, wherein said polymerization initiator is selected from the group consisting of trifluoromethanesulfonic acid and aluminum isopropoxide and mixtures thereof.

5. A method as claimed in claim 1, wherein said polymerization is cationic polymerization.

6. A method as claimed in claim 5, wherein said polymerization initiator is selected from the group consisting of $BF_3$, $SnCl_4$, $TiCl_4$, $AlCl_3$, $BF_3$ conjugated with tetrahydrofuran, $BF_3$ conjugated with diethyl ether, $BF_3$ conjugated with tert-butyl methyl ether and mixtures thereof.

7. A method as claimed in claim 1, wherein said mixture further comprises at least one co-monomer selected from the group consisting of ethylene glycol and crown ether monomers.

8. A method as claimed in claim 1, wherein the filament temperature is from about 200° C. to about 400° C.

9. A method as claimed in claim 1, wherein the gaseous monomer composition flow rate is from about 5 sccm to about 20 sccm.

10. A method as claimed in claim 1, wherein the gaseous polymerization initiator flow rate is from about 0.5 sccm to about 5 sccm.

11. A method of coating a substrate, comprising the steps of:
   placing said substrate in the reactor;
   mixing together a monomer composition comprising gaseous ethylene oxide monomer at a first flow rate, and a gaseous polymerization initiator at a second flow rate, thereby forming a mixture;
   heating said mixture with at least one heated filament to thereby cause ionic polymerization of said monomer composition to form a coating of at least one polymer on at least a portion of said substrate.

12. A method as claimed in claim 11, wherein said polymer is poly(ethylene glycol).

13. A method as claimed in claim 11, wherein said polymerization is anionic polymerization.

14. A method as claimed in claim 13, wherein said polymerization initiator is selected from the group consisting of trifluoromethanesulfonic acid and aluminum isopropoxide and mixtures thereof.

15. A method as claimed in claim 11, wherein said polymerization is cationic polymerization.

16. A method as claimed in claim 15, wherein said polymerization initiator is selected from the group consisting of $BF_3$, $SnCl_4$, $TiCl_4$, $AlCl_3$, $BF_3$ conjugated with tetrahydrofuran, $BF_3$ conjugated with diethyl ether, $BF_3$ conjugated with tert-butyl methyl ether and mixtures thereof.

17. A method as claimed in claim 11, wherein said mixture further comprises at least one co-monomer selected from the group consisting of ethylene glycol and crown ether monomers.

18. A method as claimed in claim 11, wherein the filament temperature is from about 200° C. to about 400° C.

19. A method as claimed in claim 11, wherein the substrate temperature is from about −10° C. to about 50° C.

20. A method as claimed in claim 11, wherein the gaseous monomer composition flow rate is from about 5 sccm to about 20 sccm.

21. A method as claimed in claim 11, wherein the gaseous polymerization initiator flow rate is from about 0.5 sccm to about 5 sccm.

* * * * *